(12) United States Patent
Weger et al.

(10) Patent No.: US 11,132,894 B2
(45) Date of Patent: Sep. 28, 2021

(54) DEVICE AND METHOD FOR REMOTELY OPERATING A SAFETY PROCESSING INSTALLATION

(71) Applicant: Intercable GmbH, Bruneck (IT)

(72) Inventors: Dietmar Weger, Terenten (IT); Viktor Riediger, Bielefeld (DE)

(73) Assignee: Intercable GmbH, Bruneck (IT)

( * ) Notice: Subject to any disclaimer, the term of this patent is extended or adjusted under 35 U.S.C. 154(b) by 0 days.

(21) Appl. No.: 16/638,973

(22) PCT Filed: Aug. 10, 2018

(86) PCT No.: PCT/EP2018/071729
§ 371 (c)(1),
(2) Date: Feb. 13, 2020

(87) PCT Pub. No.: WO2019/034548
PCT Pub. Date: Feb. 21, 2019

(65) Prior Publication Data
US 2020/0372787 A1 Nov. 26, 2020

(30) Foreign Application Priority Data
Aug. 18, 2017 (DE) .................... 10 2017 118 891.6

(51) Int. Cl.
*G05D 1/00* (2006.01)
*G08C 17/02* (2006.01)
(Continued)

(52) U.S. Cl.
CPC .............. *G08C 17/02* (2013.01); *F16P 3/147* (2013.01); *G01S 11/06* (2013.01); *H04W 72/048* (2013.01)

(58) Field of Classification Search
CPC .......... G08C 17/02; F16P 3/147; G01S 11/06; H04W 72/048
See application file for complete search history.

(56) References Cited

U.S. PATENT DOCUMENTS 5,746,261 A 5/1998 Bowling
7,592,911 B1 * 9/2009 Hudgens ................. F16P 3/147
340/539.13
(Continued)

FOREIGN PATENT DOCUMENTS

DE 19830359 1/2000
DE 102006052646 5/2008
(Continued)

*Primary Examiner* — Munear T Akki
(74) *Attorney, Agent, or Firm* — BainwoodHuang

(57) ABSTRACT

Techniques operate a safety processing installation. Such techniques involve remote operation using a radio remote control unit and a controller assigned to the safety processing installation. A distance monitoring unit determines a distance between the radio remote control unit and the controller. Such components are able to communicate with each other to derive an enable signal for a safety processing procedure from the distance D transmitted from the radio remote control unit or the distance monitoring unit to the controller or the radio remote control unit or a signal corresponding to the distance D and a predetermined safety distance D min, and accordingly to transmit the enable signal to the controller. The controller is additionally configured to trigger a safety processing procedure on the basis of the presence of a user-induced start signal and the enable signal in the controller.

21 Claims, 3 Drawing Sheets

(51) Int. Cl.
  *F16P 3/14*   (2006.01)
  *G01S 11/06*  (2006.01)
  *H04W 72/04*  (2009.01)

(56) References Cited

U.S. PATENT DOCUMENTS

| | | | | |
|---|---|---|---|---|
| 9,041,546 | B2* | 5/2015 | Pryor | F16P 3/147 340/686.6 |
| 10,514,672 | B1* | 12/2019 | Brooks | G08B 21/02 |
| 2003/0164447 | A1* | 9/2003 | Kudo | F16P 3/144 250/221 |
| 2004/0146303 | A1 | 7/2004 | Steffen | |
| 2009/0033269 | A1* | 2/2009 | Griessnig | H04Q 9/00 318/563 |
| 2010/0272512 | A1 | 10/2010 | Loew et al. | |
| 2011/0298579 | A1* | 12/2011 | Hardegger | G01S 17/10 340/3.1 |
| 2014/0184425 | A1* | 7/2014 | Smith | G01V 3/15 340/901 |
| 2015/0323580 | A1* | 11/2015 | Olson | G01R 29/085 324/207.22 |
| 2016/0019737 | A1* | 1/2016 | Stagg | H04W 4/023 340/5.61 |
| 2016/0261147 | A1 | 9/2016 | Blum et al. | |
| 2019/0155278 | A1* | 5/2019 | Idbrant | G05D 1/0055 |

FOREIGN PATENT DOCUMENTS

| | | |
|---|---|---|
| DE | 102011107091 | 1/2013 |
| EP | 2843637 | 3/2015 |
| EP | 3144430 | 3/2017 |
| WO | 2015140770 | 9/2015 |

* cited by examiner

DEVICE AND METHOD FOR REMOTELY OPERATING A SAFETY PROCESSING INSTALLATION

The present invention relates to a device and to a method for operating a safety processing system, in particular a safety cutting system or a safety pressing system.

In safety-relevant processing operations, it is necessary to maintain a safety distance from the user to the system. A safety-relevant operation may be for example a cutting operation in which an electrical line, in particular made from aluminum or copper, is to be cut. In order to perform such a cutting operation, use is made of electrically insulated safety cutting systems, which are also referred to as cable cutters. Such safety cutting systems are used when it is not able to be ensured that a cable with a nominal voltage of up to 60 kV and a significant cross section of for example 85 mm$^2$ [square millimeters] and more is in a voltage-free state. In connection with safety cutting operations, DIN EN 50340 (VDE 0682-661) for example provides precise specifications as to which safety-relevant measures are applicable or must be observed.

In order to meet the safety requirements when cutting a cable, electrically insulated, hydraulically actuated safety cutting systems are known. The known safety cutting systems have a cutting head that contains the cutting unit for cutting a cable. The cutting unit is operated by way of hydraulic pressure. The cutting head is connected, via an insulated hose, to a pump that generates the required pressure of an insulating hydraulic fluid in the insulated hose in order to drive the cutting head. The insulated hose and the hydraulic fluid form an insulated section between the cutting head and the pump.

The cutting head is positioned on the cable in order to perform a cutting operation. The insulated hose, which has a predefined length of for example 10 m, is positioned in full and loosely. It should however be noted here that, when the pump is actuated, the position of the cutting head on the cable does not change due to the pressure-dependent change in length of the hose. The pump is positioned at a predefined safety distance from the cutting point. The pressure required to actuate the cutting head is generated by way of the pump. A cutting operation is finished only when a predefined pressure has been reached.

When cutting cables, if the cable is not voltage-free, the high voltages may lead to high short-circuit currents and thus to dangerous arcing effects that are dangerous for the user. The user therefore has to maintain a certain safety distance from the safety cutting system during the safety cutting operation. If a cutting operation is triggered, this then has to be performed in full, since there is the possibility of the cutting head becoming firmly welded to the cable if the cable is not voltage-free. There is therefore no possibility of an emergency shutdown, which further increases the risk for the user.

Based on this, the object of the present invention is to increase the safety of a user of a safety processing system, in particular of a safety cutting system or of a safety pressing system. This object is achieved by a device for remotely operating a safety processing system, a safety processing system having a remote operation device and a method for remotely operating a safety processing system as disclosed herein. Further disclosed herein are advantageous refinements. It should be pointed out that the features disclosed herein may be combined with one another in any technologically expedient manner and define further embodiments of the invention. Furthermore, features disclosed herein are clarified and explained in more detail in the description, with further preferred refinements of the invention being illustrated.

The device according to the invention for remotely operating a safety processing system, in particular a safety cutting system or a safety pressing system, comprises a radio remote control that has a first radio transceiver and a controller that is able to be assigned to the safety processing system and that has a second radio transceiver. There is also provision for a distance monitoring unit that is configured and suitable for determining a distance D between the radio remote control and the controller. The first radio transceiver and the second radio transceiver may be connected to one another in terms of communication and are configured to exchange data with one another via radio signals in a connected state. The distance monitoring unit and at least the radio remote control or the controller are connected in terms of communication and configured to transmit the distance D or a signal corresponding to the distance D from the distance monitoring unit to at least the radio remote control or the controller. The controller or the radio remote control is furthermore configured to derive an enable signal for a safety processing operation from the distance D correspondingly transmitted from the radio remote control or the distance monitoring unit to the controller or the radio remote control or a signal corresponding to the distance D and a predetermined safety distance D min, and accordingly to transmit the enable signal to the controller. The controller is additionally configured to trigger a safety processing operation based on the presence of a user-induced start signal and the enable signal at the controller.

The safety processing system may be refitted for different tasks by using different tool heads. By way of example, a safety cutting head for safety cutting operations or a safety press head for safety pressing operations may be used in the safety processing system.

The protection of a user of the safety processing system is increased by the device according to the invention for remotely operating the safety processing system (for example safety cutting system, safety pressing system, etc.).

The controller of the device preferably has a dedicated energy supply. There is however also the option of supplying the controller of the device with electrical energy via the safety processing system. The safety cutting system may in this case have an energy supply such as a battery, an accumulator or a power supply connected to a power grid. The controller may be connected to a safety processing system as a separate module. This opens up the possibility of equipping pre-existing safety processing systems with the device according to the invention. The controller is preferably an integral part of a safety processing system.

If the safety processing system has an electrically operated pump whose energy is supplied by way of a battery or an accumulator, then the controller is preferably designed such that a safety processing operation is able to be triggered only if there is enough electrical energy available for a complete safety processing operation.

The radio remote control is preferably supplied with electrical energy by a dedicated energy source, such as a battery. The electrical energy may be provided at a voltage of 5 V [volts].

The radio remote control and/or the controller may comprise an integrated circuit for signal processing. The integrated circuit may be a microcontroller (μC) or an application-specific integrated circuit (ASIC) or an application-specific standard product (ASSP) or a field-programmable gate array (FPGA) or the like. The integrated circuit may comprise a volatile or a non-volatile memory. The volatile memory may be a memory with random/direct access (random access memory, RAM). The non-volatile memory may be a secondary memory such as for example a hard disk, a CD, a DVD, a floppy disk or a semiconductor memory (for example EPROM or flash memory or the like).

As soon as the radio remote control, via the first radio transceiver, is connected in terms of communication to the controller via the second radio transceiver, the user is able to trigger the safety processing operation after said user has accordingly prepared and set the safety processing system for the processing operation. To this end, said user first of all has to trigger the start signal by performing an appropriate input on the radio remote control and/or the controller. For the safety processing operation to be triggered by the controller, the distance D also has to be at least equal to or greater than the predefined safety distance $D_{min}$. The controller outputs the enable signal only when this condition is met. The safety processing operation is in this case triggered by the controller only whenever both the start signal, which was triggered by the user, and the enable signal, which is based on the distance D, are present.

The distance monitoring unit may be an integral part of the controller or, alternatively, of the radio remote control. The distance D between the radio remote control and the controller may thus either be determined by the controller (by way of the distance monitoring unit) and used directly in the controller in order to derive the enable signal or be determined by the radio remote control (by way of the distance monitoring unit) and be transmitted to the second radio transceiver of the controller via the first radio transceiver in order to derive the enable signal.

If the distance monitoring unit is integrated into the controller, then this has the advantage that the distance D does not have to be transmitted to the controller first, but rather is present directly in the controller in order to derive the enable signal. The enable signal may be derived from the current distance D between the radio remote control and the controller and the predefined safety distance $D_{min}$ with a period of 1 kHz [kilohertz] in the controller. Alternatively, it would also be conceivable for the enable signal to be derived in the radio remote control and for the enable signal to be transmitted to the controller in order to trigger the safety processing operation.

The first radio transceiver and the second radio transceiver may be operated and communicate with one another in an ISM band (Industrial, Scientific and Medical band), preferably in a frequency band between approximately 2.4 GHz [gigahertz]-5 GHz. Information may be exchanged between the radio remote control and the controller or the first radio transceiver and the second radio transceiver in defined time intervals, preferably in time intervals of 0.5 s [seconds]. The information is preferably exchanged in an encrypted manner.

If the specified safety distance $D_{min}$ is fallen below during a safety processing operation that is already in progress, then an acoustic and/or optical warning signal may be output for the user. The minimum distance $D_{min}$ may be set in a setup and thus adapted to different specifications for different safety processing operations and/or situations. There may also be provision to provide a choice between a safety processing mode and a normal processing mode, such that, depending on the current task and/or situation, it is possible to perform a safety processing operation or a normal processing operation.

The device for remotely operating the safety processing system offers safer active monitoring of the distance between the user and the safety processing system. Safety for the user is increased significantly by the device according to the invention, since a direct distance measurement takes place and the safety processing operation is triggered and performed only if the safety distance is maintained. In addition, in the case of safety processing systems with a remote operation device according to the invention, it is possible to dispense with an elastic insulated hose with a length corresponding to the safety distance $D_{min}$ between the tool head and the pump, since the safety distance $D_{min}$ between the user and the tool head is ensured by the remote operation device.

According to a further advantageous aspect, the distance monitoring unit is configured and intended to measure field strengths of the radio signals between the first radio transceiver and the second radio transceiver and to derive the distance D from the measured field strengths.

The radio remote control and the controller transmit information or data via the radio transceivers. These data may also only serve the purpose of determining the distance D between the radio remote control and the controller and thus the safety processing system. The field strength P of the radio signals between the first radio transceiver and the second radio transceiver is essentially inversely proportional to the cube of the distance D between the source and the measuring point:

$$P \sim 1/D^3$$

In this case, the first radio transceiver and the second radio transceiver may serve as a source and/or as a measuring point. If the original amplitude (transmission power) is known, the distance D between the transmitting transceiver and the receiving transceiver may be determined using the above relationship through an amplitude, corresponding to the field strength P, of the radio signals at the receiving transceiver.

Determining the distance D through the field strength offers an accurate and robust option for ensuring the distance D and thus the maintenance of the predefined safety distance $D_{min}$.

According to a further aspect, the distance monitoring unit is configured and intended to calculate path distances of the radio remote control based on measured values of at least one spatial movement unit, in particular based on acceleration values of an accelerometer that is arranged on the radio remote control, and to derive the distance D from the calculated path distances or from the measured field strengths and the calculated path distances.

The spatial movement unit is preferably formed by an inertial measurement unit. The inertial measurement unit preferably comprises a spatial combination of several inertial sensors such as acceleration sensors, rotation meters, rotation sensors, torque transmitters, gyroscopes and an electronic compass.

The inertial measurement unit may preferably comprise an acceleration sensor for each of three mutually perpendicular directions. The path distance covered in each of the three directions may be determined from the acceleration values through summing or integrating over time. Based on these path distances, it is possible to derive the distance D from a starting point, here the safety processing system, and the current position of the radio remote control and thus of the user.

Distance monitoring may also be performed additionally or solely on the basis of GPS data.

The prescribed safety distance should essentially be in a horizontal plane with respect to the safety processing system since, for example due to arcing effects, a distance only above the safety processing system is not acceptable. By deriving the distance from the path distances, a horizontal distance is able to be derived, thus ensuring that the safety distance is maintained in an essentially horizontal plane.

The distance D may furthermore be derived both from the measured field strength and from the calculated path distances in order to increase the precision or in order to be able to perform a plausibility check on the respectively determined distances. This increases the safety of the device even further.

According to a further aspect, the radio remote control has an input apparatus that is connected in terms of communication to the first radio transceiver. The radio remote control is furthermore configured to transmit the start signal via the first radio transceiver upon input by way of the input device. The controller is furthermore configured to receive the start signal via the second radio transceiver.

The user is able to trigger the start signal via the radio remote control. This offers various options for triggering the safety processing operation. The user may first trigger the start signal on the radio remote control and then move away from the safety processing system, such that the safety processing operation is triggered only when said user has reached the predefined safety distance $D_{min}$. Alternatively, the user may also first move away by the safety distance $D_{min}$ or more and then send the start signal via the remote control. However, it is not possible to trigger the safety processing operation if the user is initially far enough away and then moves back into an area that is at a distance D that is less than the safety distance $D_{min}$. This is because, although the enable signal would then initially be present since the safety distance was maintained, the enable signal is immediately canceled if the user is no longer far enough away, such that the safety processing operation is not triggered even if said user triggers the start signal. This would only happen when the user has moved far enough away again and the safety distance $D_{min}$ is reached and a start signal is output again. If the safety distance is fallen below, a warning signal may also be generated.

According to a further advantageous refinement of the method, it is proposed for a countdown also to be started when a start signal is triggered. If the safety processing operation is not triggered within a settable time window (countdown), then the operation is terminated and signaled to the user.

This offers a more variable form of the operating sequence for the user without in the process jeopardizing the safety of the user, since it is always ensured that the safety distance is maintained when the safety processing operation is triggered.

The radio remote control may be configured to transmit a reset signal to the controller upon input by the user. This reset signal prompts the controller to reset a lifting cylinder of the safety processing system and thus to return a tool to its starting position.

According to a further aspect, the radio remote control and the controller each have a unique address. The radio remote control and the controller are able to be coupled uniquely to one another by way of the unique addresses.

During the pairing, the radio remote control and/or the controller compare a stored unique address (known from a learning operation) with the address of the respective other party. If the stored address and the address of the communication partner match, the connection between the radio remote control and the controller is established and maintained.

The unique coupling of the radio remote control and the controller increases the safety of the safety processing system, since incorrect data transmissions and thus undesired inputs or incorrect distance derivations by other radio devices are not able to occur.

According to a further aspect, the device comprises a fall monitoring unit that is configured to determine the presence of a fall. The fall monitoring unit is in this case configured to derive the presence of a fall based on the acceleration values of the accelerometer or based on angular acceleration values of an angular accelerometer that is arranged on the radio remote control. The controller or the radio remote control is furthermore configured to derive the enable signal additionally taking into consideration the presence of a fall.

The angular accelerometer may comprise angular acceleration sensors for three rotations that are perpendicular to one another in order to determine angular acceleration values in the three perpendicular directions of rotation. By monitoring the acceleration values and/or the angular acceleration values, it is for example possible to detect a fall of a user, since in this case particularly high acceleration values and angular acceleration values are present. Based on the detection of a fall, the triggering of the safety processing operation may be prevented. For this purpose, the derivation of the enable signal also takes into account whether a fall is present. If so, the safety processing operation is not started or an enable signal not generated, even if the safety distance has been maintained. Relatively high acceleration values and/or angular acceleration values may also be present if the radio remote control is dropped or thrown.

The fall monitoring increases safety when using the safety processing system even further, since the readiness of the user is also indirectly monitored. If relatively high acceleration values and/or angular acceleration values are present, these may be an indication of improper handling in connection with the safety processing system.

According to a further aspect, the radio remote control has at least one display apparatus, preferably at least one light-emitting diode or a graphic display as a display apparatus, and particularly preferably at least one status LED and an activity LED and a graphic display as a display apparatus.

The user is provided with information relating to the safety processing system and/or the safety processing operation via the display apparatus of the radio remote control. For example, the current status of the safety processing system may thus be displayed to the user by way of the status LED. The connection status of the radio connection between the radio remote control and the controller may be displayed to the user by way of the activity LED. In addition, the reaching of the predetermined safety distance $D_{min}$ may be displayed to the user via the graphic display or further LEDS.

By providing information about the safety processing system and/or the safety processing operation on the radio remote control, handling is made easier and more convenient for the user.

The input apparatus of the radio remote control may be formed by pushbuttons, rotary knobs, switches and the like. A touch-sensitive display may preferably be used as a combined input and display apparatus for the radio remote control.

According to a further aspect, the radio remote control is configured to display the distance transmitted from the distance monitoring unit or the controller to the radio remote control by way of the display device.

The current distance D may for example be displayed to the user via the graphic display.

By providing the current distance, the user is able to trigger the safety processing operation even more quickly since said user is able to see at a glance when he has reached the required safety distance.

According to a further aspect, the controller has at least one display apparatus, preferably at least one light-emitting diode or a graphic display as a display apparatus, and particularly preferably at least one status LED or a graphic display as a display apparatus.

The user is provided with information about the safety processing system and/or the safety processing operation via the display apparatus of the controller. For example, the current status of the safety processing system may thus be displayed to the user by way of the status LED. The status LED of the radio remote control may in this case reflect the status LED of the controller, such that both status LEDs always provide the same display and thus provide information about the current state of the safety processing system in the same way. The connection status of the radio connection between the radio remote control and the controller may be displayed to the user by way of the activity LED.

By providing information about the safety processing system and/or the safety processing operation on the controller, handling is made easier and more convenient for the user.

According to a further aspect, the controller is connected to at least one sensor of the safety processing system and is configured to read a progress value of the safety processing operation. The controller and the radio remote control are in this case configured to transmit the progress value from the controller to the radio remote control. The radio remote control is furthermore configured to display the progress value by way of the display device.

The sensor may be for example a position sensor and/or a pressure/force sensor whose sensor value provides information about the progress of the safety processing operation. A progress value for the safety processing operation is derived from the sensor value and transmitted to the first transceiver of the radio remote control from the second transceiver of the controller by way of radio signals. The progress value is displayed on the radio remote control, for example via a progress bar on the graphic display of the display apparatus.

Providing information about the progress of the safety processing operation leads to increased convenience and increased safety for the user, since said user is able to keep track of how the safety processing operation is progressing and when it is finally completed and when the safety distance is able to be safely fallen below again.

The present invention furthermore relates to a safety processing system, in particular a safety cutting system or a safety pressing system having a device for remotely operating the safety processing system. The device for remotely operating the safety processing system comprises a radio remote control that has a first radio transceiver, and a controller that is arranged on the safety processing system and that has a second radio transceiver. A distance monitoring unit, which is configured to determine a distance D between the radio remote control and the controller, is furthermore provided.

The first radio transceiver and the second radio transceiver may be connected to one another in terms of communication and are configured and intended to exchange data with one another via radio signals in a connected state.

The distance monitoring unit and at least the radio remote control or the controller are furthermore connected in terms of communication and accordingly configured to transmit the distance D from the distance monitoring unit to at least the radio remote control or the controller. The controller or the radio remote control is furthermore configured to derive an enable signal for a safety processing operation from the distance D correspondingly transmitted from the radio remote control or the distance monitoring unit to the controller or the radio remote control and a predetermined safety distance $D_{min}$ and accordingly to transmit the enable signal to the controller. The controller is additionally configured to start the safety processing operation based on the presence of a user-induced start signal and the enable signal at the controller.

The safety processing system preferably comprises an actuation unit by way of which it is possible to directly or indirectly actuate a processing head. The processing head preferably has a processing unit. The actuation unit is preferably an oleodynamic pump. The processing unit may be for example a cutting tool, a pressing tool, a punching tool and the like. The cutting tool may be designed in particular for cables, preferably for cables with a diameter between approximately 85 mm [millimeters] and 120 mm. The controller may be connected to a system controller of the safety processing system directly or via an adapter. Alternatively, the controller may be an integral part of the system controller.

The advantages and details of a device for remotely operating a safety processing system also apply to a safety processing system, in particular a safety cutting system or a safety pressing system, having a corresponding device for remotely operating the safety processing system as illustrated and explained above.

According to a further aspect, in the case of the safety processing system, the device for remotely operating the safety processing system is designed in accordance with one of the previously described embodiments.

The present invention furthermore relates to a method for remotely operating a safety processing system, in particular a safety cutting system or a safety pressing system. The method comprises the following steps:
a) Determining a distance D between a radio remote control and a second radio transceiver that is assigned to a safety-relevant area of the safety processing system.
b) Deriving an enable signal for a safety processing operation from the determined distance D and a predetermined safety distance $D_{min}$.
c) Starting the safety processing operation based on the presence of a user-induced start signal and the enable signal at the controller.

In step a), it is determined how far away the radio remote control and thus the user is from a safety-relevant area of the safety processing system. As soon as the distance D is at least equal to the predefined safety distance $D_{min}$, an enable signal is output. The safety processing operation is started only when the enable signal and a start signal induced by the user are present.

Directly monitoring the distance D significantly increases the safety of safety processing systems, since the safety processing operation is able to be started only when at least the safety distance is maintained.

According to a further aspect, determining the distance D comprises the following steps:
a1.1) Measuring field strengths of radio signals between a first radio transceiver of the radio remote control and a second radio transceiver
a1.2) Deriving the distance D from the measured field strengths.

Using the relationship $$P \sim 1/D^3,$$

an amplitude, corresponding to the field strength P, of the radio signals at the receiving transceiver, if the original amplitude (transmission power) is known, may be used to determine the distance D between the transmitting transceiver and the receiving transceiver and thus between the radio remote control and the controller, or vice versa.

Determining the distance D through the field strength offers an accurate and robust option for ensuring the distance D and thus the maintenance of the predefined safety distance $D_{min}$.

According to a further aspect, determining the distance D comprises the following steps:

a2.1) Calculating path distances of the radio remote control based on acceleration values from an accelerometer and/or the measured values of an inertial measurement unit that is arranged on the radio remote control.

a2.2) Deriving the distance D from the calculated path distances or from the measured field strengths and the calculated path distances.

From the measured values, in particular the acceleration values that are determined in three mutually perpendicular directions, the path distance traveled in each of the three directions may be calculated through summing or integrating over time. Based on these path distances, it is possible to derive the distance D from a starting point, here the safety processing system, and the current position of the radio remote control and thus of the user.

Since, in many cases, the safety distance has to be maintained in a horizontal plane, a purely horizontal distance may be derived through the derivation of the distance from the path distances, thus ensuring that the safety distance is maintained in the horizontal plane.

The distance D may furthermore be derived both from the measured field strength and from the calculated path distances. This increases the accuracy of the derived distance. A plausibility check on the distances determined in both ways may additionally be performed. This increases the safety of the method even further.

According to a further aspect, in step c), the start signal is transmitted from the radio remote control to the controller upon input by way of an input device of the radio remote control.

The user is able to trigger the start signal via the radio remote control. This offers various options for starting the safety processing operation. The user may first trigger the start signal on the radio remote control and then move away from the safety processing system, such that the safety processing operation is started only when said user has reached the predefined safety distance $D_{min}$. Alternatively, the user may also first move away by the safety distance $D_{min}$ or more and then send the start signal via the remote control.

This offers a more variable form of the operating sequence for the user without in the process jeopardizing the safety of said user, since it is always ensured that the safety distance is maintained when the safety processing operation is started.

According to a further aspect, the method comprises at least one of the following initialization steps before step a):

i1) Establishing a radio connection between the first radio transceiver of the radio remote control and the second radio transceiver of the controller.

i2) Uniquely coupling the radio remote control and the controller via unique addresses in each case assigned to the radio remote control and the controller.

Before a safety processing operation is able to be started by way of the method, the radio remote control has to be connected to the controller.

In addition or alternatively, the coupling may take place initially. In this case, the radio remote control and/or the controller compare a stored unique address with the address of the respective other party. If the stored address and the address of the communication partner match, the connection between the radio remote control and the controller is established and maintained.

Uniquely coupling the first radio transceiver and the second radio transceiver via addresses that are in each case uniquely assigned to the first radio transceiver and the second radio transceiver increases the safety of the safety processing system, since incorrect data transmissions and thus undesired inputs or incorrect distance derivations by other radio devices are not able to occur.

According to a further aspect, the addresses that are in each case uniquely assigned to the first radio transceiver and the second radio transceiver are correspondingly disclosed to one another in a learning operation.

The first radio transceiver is part of the radio remote control. The second radio transceiver is a component of a controller. The controller and the radio remote control are disclosed to one another in the learning operation before the safety processing system is used. The controller and/or the radio remote control in this case store a corresponding unique address of the other party and from then on communicate only with this one communication partner. The controller and the radio remote control are thus coupled uniquely to one another. The same controller may in this case be coupled to the same radio remote control again and again without a new learning operation.

As a result of the learning operation, there is always only one valid pairing of radio remote control and controller. This increases the safety of the method, since it is not possible to establish a connection between an unknown radio remote control and a controller.

According to a further aspect, the method furthermore comprises at least one of the following steps:

d) deriving the presence of a fall based on the acceleration values of the accelerometer or based on angular acceleration values of an angular accelerometer that is arranged on the radio remote control, wherein, in step b), the derivation of the enable signal is additionally based on the presence of a fall;

e) transmitting the distance D to the radio remote control and displaying the distance D on a graphic display of the radio remote control;

f) transmitting a progress value of the safety processing operation to the radio remote control and displaying the progress value on the graphic display of the radio remote control;

g) continuously recording and checking a movement sequence of the radio remote control.

The angular accelerometer may comprise angular acceleration sensors for three rotations that are perpendicular to one another in order to determine angular acceleration values in the three perpendicular directions of rotation. By monitoring the acceleration values and/or the angular acceleration values, it is possible to detect a fall, since in this case particularly high acceleration values and angular acceleration values are present. Based on the detection of a fall, the triggering of the safety processing operation may be prevented. For this purpose, the derivation of the enable signal also takes into account whether a fall is present. If so, the safety processing operation is not started or an enable signal not generated, even if the safety distance has been maintained.

The fall monitoring further increases safety when using the safety processing system, since the readiness of the user is also indirectly monitored.

The current distance D may be transmitted from the distance monitoring unit directly or via the controller to the radio remote control and be displayed to the user, for example via a graphic display.

By providing the current distance, the user is able to trigger the safety processing operation even more quickly since said user is able to see at a glance when he has reached the required safety distance.

A progress value for the safety processing operation may be derived from the sensor value of a pressure/force sensor and/or position sensor of the safety processing system and transmitted to the radio remote control. The progress value is displayed on the radio remote control, for example via a progress bar on the graphic display of the display apparatus.

Displaying the progress value of the safety processing operation leads to increased convenience and increased safety for the user, since said user is able to keep a live track of how the safety processing operation is progressing and when it is finally completed and when the safety distance is able to be safely fallen below again.

The distance D may be recorded and stored continuously, such that the movement sequence of the radio remote control and thus of the user is able to be checked.

This may be helpful when diagnosing faults or when reconstructing accidents.

By restricting the validity of the enable signal, undesired restarting of a safety processing operation is for example avoided.

According to a further aspect, the method furthermore comprises at least one of the following checking steps:

p1) continuously checking a volatile memory of the controller, preferably by way of checksum methods;
p2) continuously checking a non-volatile memory of the controller, preferably by way of checksum methods;
p3) continuously checking an operating voltage and a processor of the controller, preferably by way of a watchdog;
p4) continuously checking an integrated circuit of the controller, preferably by way of plausibility checking methods.

The safety of the method is further increased by integrating automatic system checking mechanisms. The plausibility check preferably also comprises the operator input signals.

The invention and the technical environment are explained in more detail below with reference to the figures. It should be pointed out that the figures show a particularly preferred variant embodiment of the invention, without however being restricted thereto. In the figures.

Figure 1:
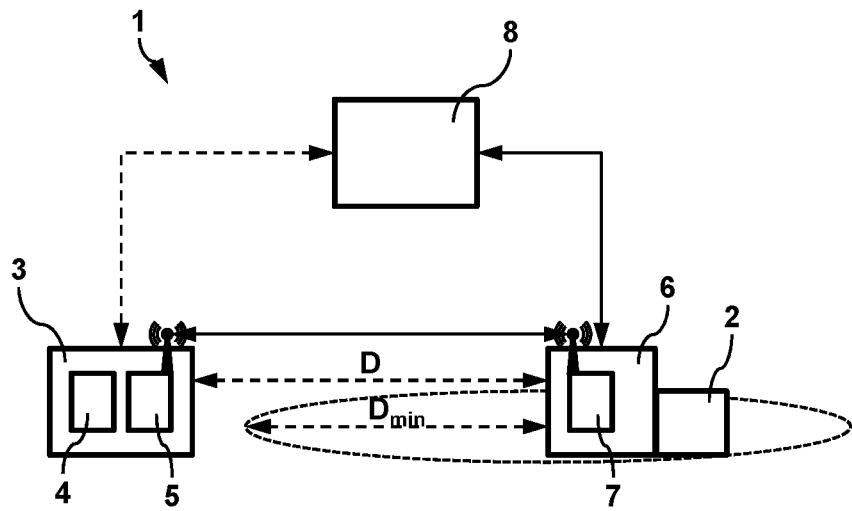
FIG. 1 shows a schematic illustration of a device for remotely operating a safety processing system.

FIG. 1 schematically shows a device 1 for remotely operating a safety processing system 2, in particular a safety cutting system (see FIG. 5) or a safety pressing system.

A radio remote control 3 of the device 1 comprises an input apparatus 4 and a first radio transceiver 5. A controller 6 of the device 1 comprises a second radio transceiver 7. The controller 6 is arranged on the safety processing system 2 and connected thereto via an adapter (not illustrated). The first radio transceiver 5 and the second radio transceiver 7 are connected in terms of communication. A distance monitoring unit 8 is integrated in the controller 6 and connected thereto in terms of communication. Alternatively, the distance monitoring unit 8 could also be integrated in the radio remote control 3 and connected thereto in terms of communication (dashed arrow).

The distance monitoring unit 8 continuously determines a distance D between the radio remote control 3 and the controller 6. For this purpose, the field strength P or the amplitude of radio signals that are transmitted from the radio remote control 3 to the controller 6 is analyzed and a first distance $D_1$ is determined therefrom together with a known transmission power of the radio remote control 3, on the one hand. On the other hand, path distances in a horizontal x direction and a horizontal y direction perpendicular thereto are calculated from the radio remote control by temporal summing or integration, and the distance $D_2$ in the horizontal x-y plane is likewise determined from the path distances. The two distances $D_1$ and $D_2$ are combined to form a distance D. The distance D may also be derived directly from the measured field strengths and the calculated path distances. As soon as the distance D is greater than or equal to a predefined safety distance $D_{min}$, an enable signal is generated by the controller 6. The user is able to trigger a start signal via the input apparatus 4. As soon as the enable signal and the start signal are present, the safety processing operation is started by the controller 6. The controller 6 is connected in terms of signaling to the system controller of the safety processing system 2. If the enable signal and the start signal of the controller 6 are present, then said controller generates a signal to the system controller such that the system controller is able to trigger a safety-relevant operation in the safety processing system.

Figure 2:
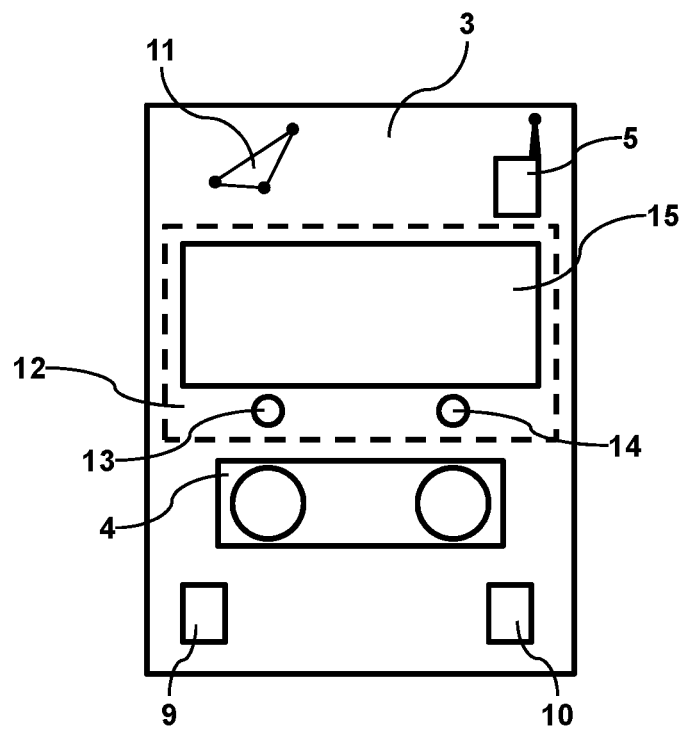
FIG. 2 shows a schematic illustration of a radio remote control of the device from FIG. 1.

FIG. 2 shows the radio remote control 3 with the input apparatus 4 and the first radio transceiver 5. The radio remote control 3 furthermore comprises an accelerometer 9 and an angular accelerometer 10. The acceleration sensor and/or the angular acceleration sensor is or are preferably part of an inertial measurement unit. A compass apparatus may additionally also be provided.

The accelerometer comprises three acceleration sensors, a respective one of which measures the acceleration in the x direction, in the y direction and in a z direction perpendicular thereto. The path distances in the x direction and in the y direction are calculated from the acceleration values in the three directions. Similarly, the angular accelerometer 10 comprises three angular acceleration sensors, a respective one of which measures the angular acceleration around the x direction, around the y direction and around the z direction. Using the acceleration values and the angular acceleration values, the distance D2 in the x-y plane is able to be determined with high precision even if the radio remote control 3 is not held in a stable position, but rather is tilted away from the safety processing system or tilted back and forth during the movement. A fall monitoring unit (not shown explicitly) may also be used to derive a fall from the acceleration values and the angular acceleration values. If a fall has been detected by the fall monitoring unit, the safety processing operation is not triggered or the enable signal is not generated, even if the safety distance $D_{min}$ has been reached.

A distance measurement may optionally also be performed using an optical method, with a marker 11 being attached to the radio remote control 3. For this purpose, a marker (not illustrated) is likewise attached to the controller 6. The position of the radio remote control 3 relative to the controller 6 may be determined via an optical 3D camera (for example in the infrared range) and a distance D3 may be determined therefrom.

A display apparatus 12 of the radio remote control 3 consists of a status LED 13, an activity LED 14 and a graphic display 15. The status LED 13 displays the current state of the safety processing system 2. The activity LED 14 displays whether the radio remote control 3 is connected to the controller 6. The graphic display 15 may display the distance D and/or a progress of the safety processing operation.

Figure 3:
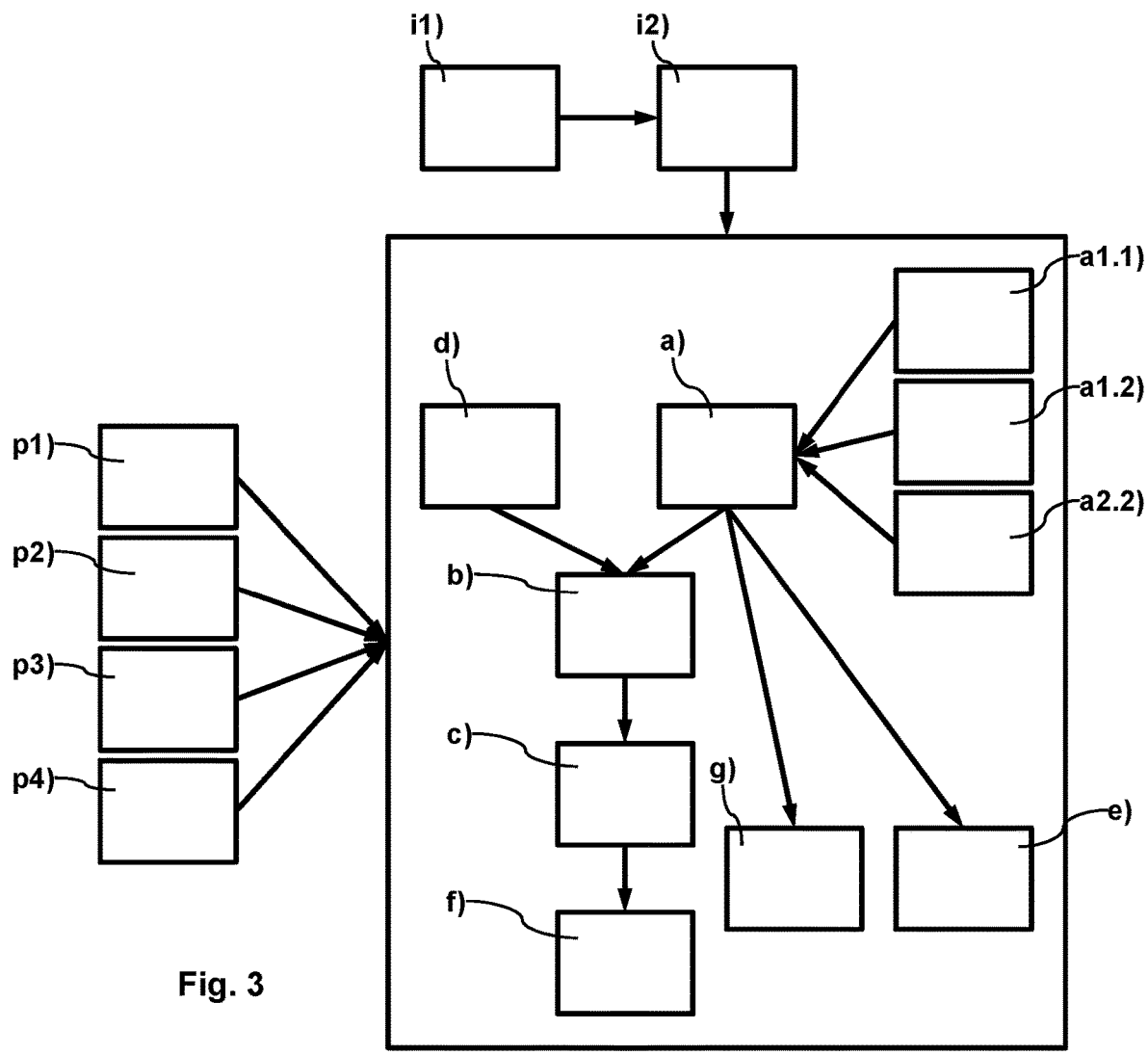
FIG. 3 shows a schematic illustration of a method for remotely operating a safety processing system.

FIG. 3 schematically shows a method for remotely operating a safety processing system 2 according to FIG. 1, in particular a safety cutting system or a safety pressing system. In an initialization step i1), a radio connection is established between the first radio transceiver 5 of the radio remote control 3 and the second radio transceiver 7 of the controller 6. In this case, data are transmitted by radio, wherein the communication may take place according to a standardized protocol (for example Bluetooth, WLAN/WiFi, ZigBee, etc.). As soon as the radio connection is established, in an initialization step i2), the radio remote control 3 and the controller 6 or the first radio transceiver 5 and the second radio transceiver 7 are uniquely coupled. For this purpose, the radio remote control 3 and/or the controller 6 transmit their unique addresses to the respective other party. The radio remote control 3 and/or the controller 6 compare the address transmitted by the communication partner with a respectively stored address that was stored in a learning operation. If the transmitted and the stored address match, the communication partner is accepted and the radio remote control 3 and the controller 6 are uniquely coupled to one another.

In a step a), a distance D between the radio remote control 3 and the controller 6 is determined. For this purpose, in a step a1.1), field strengths P of radio signals between the first radio transceiver 5 and the second radio transceiver 6 are measured. In a step a2.1), path distances of the radio remote control 3 are calculated based on acceleration values from the accelerometer 9. Then, in a step a2.2), the distance D is derived from the measured field strengths P using the relationship $P \sim 1/D^3$ and the calculated path distances by time-integrating the acceleration values in the x-y plane. In a step d), the presence of a fall is derived based on the acceleration values of the accelerometer 9 or based on angular acceleration values of the angular accelerometer 10. Then, in step b), the enable signal for a safety processing operation is derived from the determined distance D and the predetermined safety distance $D_{min}$, wherein the derivation of the enable signal is also based on the presence of the fall, such that, if a fall was detected, the safety processing operation is not started or the enable signal is not generated. In step c), the safety processing operation is finally started based on the presence of a user-induced start signal and the enable signal at the controller 6, wherein the start signal is transmitted from the radio remote control 3 to the controller 6 upon input by way of the input apparatus 4. The enable signal is in this case valid in each case only for a single safety processing operation. In addition, in step f), a progress value of the safety processing operation, which is determined from sensor values of a position sensor and/or of a pressure sensor, is transmitted to the radio remote control 3 and displayed on the graphic display 15.

In a step e), the distance D is also transmitted to the radio remote control 3, wherein the distance D is displayed on the graphic display 15. In addition, in a step g), a movement sequence of the radio remote control is continuously recorded and checked based on the path distances.

The device 1 on which the method is executed is continuously checked in terms of its operational readiness by various checking steps. These checks are optional, but contribute to increased safety for the user. For this purpose, in a checking step p1), a volatile memory of the controller 6 is checked continuously, preferably by way of checksum methods. Furthermore, in a checking step p2), a non-volatile memory of the controller 6 is checked continuously, preferably by way of checksum methods. Furthermore, in a checking step p3), an operating voltage and a processor of the controller 6 are checked continuously, preferably by way of a watchdog. In addition, in a checking step p4), an integrated circuit of the controller 6 is checked continuously, preferably by way of plausibility checking methods.

Figure 4:
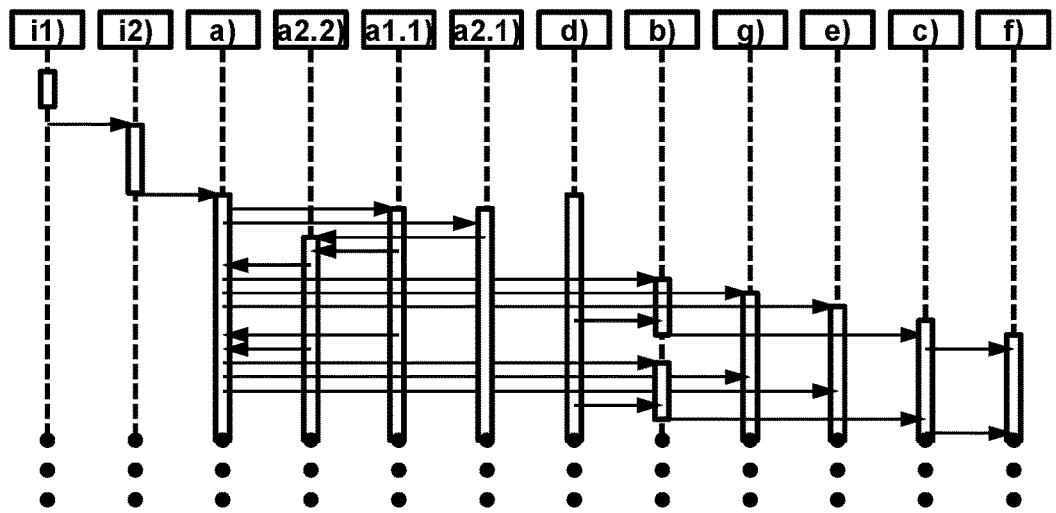
FIG. 4 shows an exemplary flowchart of the method from FIG. 3.

FIG. 4 schematically shows a possible temporal sequence of the individual steps of the method from FIG. 3. After the initial establishment of the radio connection between the controller 6 and the radio remote control 3 in initialization step i1) and the unique coupling in initialization step i2), the distance D between the radio remote control 3 and controller 6 is determined continuously in step a). For this purpose, in step a1.1), the field strength P and, in step a2.1), the path distances in the x-y plane are determined from the acceleration values of the accelerometer 9. In step a2.2), the distance D is then derived from the field strength P and the path distances. In step d), in parallel with step a), a fall is determined using the acceleration values and the angular acceleration values of the angular accelerometer 10. In step b), the enable signal is then derived based on the distance D and the predetermined safety distance $D_{min}$, taking into account the presence of a fall. Furthermore, in step g), the movement sequence of the radio remote control 3 is continuously recorded and checked. Furthermore, in step e), the distance D is continuously transmitted to the radio remote control 3, such that the distance D is able to be displayed to the user via the graphic display 15 of the display apparatus 12. In step c), the safety processing operation is started as soon as the enable signal and the start signal, which is given by the user via the input apparatus 4 of the radio remote control 3, are present at the controller 6. In step f), the progress of the safety processing operation, based on the sensor value of the safety processing system 2, is displayed continuously to the user by way of the graphic display 15 of the display apparatus 12.

Checking steps p1) to p4), not illustrated in FIG. 4, may be performed immediately after switching on the controller 6 or the radio remote control 3 and/or after the initialization steps i1) and i2) and/or at predetermined times during operation.

Figure 5:
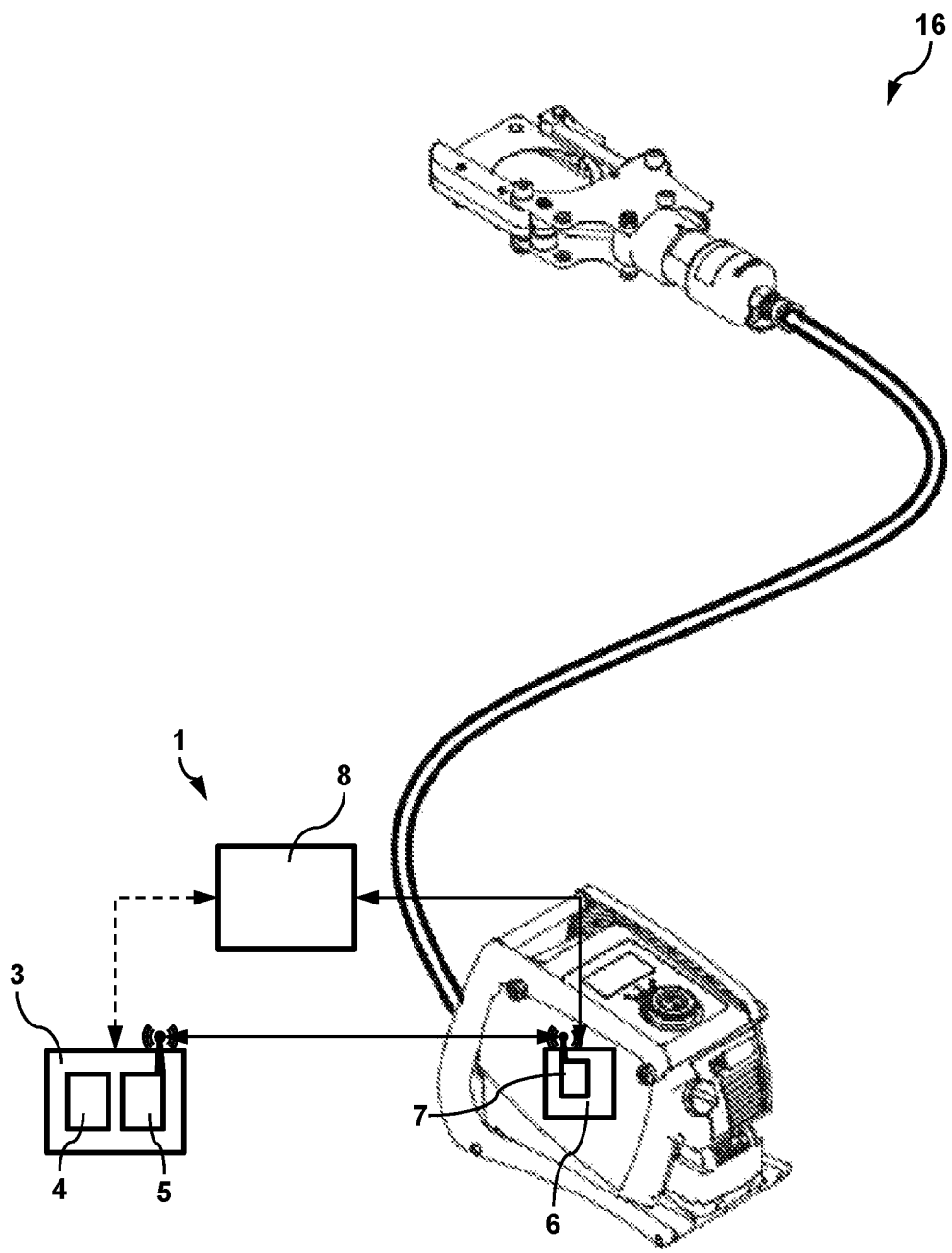
FIG. 5 shows a schematic illustration of a safety processing system.

FIG. 5 schematically shows a safety cutting system 16 having a remote operation device 1. The safety cutting system 16 comprises an oleodynamic pump 17 with an integrated system controller, a cutting head 18 with a cylinder and a working piston and an elastic insulated tube 19 that connects the pump 17 and the cutting head 18. The controller 6 of the device 1 is coupled to the pump 17 via an adapter (not illustrated) and connected in terms of communication to the system controller. A safety cutting operation may be triggered by a user by said user triggering a start signal via the input apparatus 4 of the radio remote control 3, which start signal is transmitted via a first radio transceiver 5 of the radio remote control 3 to a second radio transceiver 7 of the controller 6, and, at the same time as the radio remote control 3, adopting a distance D from the safety cutting system 16 that is greater than or equal to the predetermined safety distance $D_{min}$, such that an enable signal (derived as described above) is present at the controller 6 in addition to the start signal.

LIST OF REFERENCE SIGNS 1 remote operation device
2 safety processing system
3 radio remote control
4 input apparatus
5 first radio transceiver
6 controller
7 second radio transceiver
8 distance monitoring unit
9 accelerometer
10 angular accelerometer
11 marker
12 display apparatus
13 status LED
14 activity LED
15 graphic display
16 safety cutting system
17 oleodynamic pump
18 cutting head
19 elastic insulated hose

The invention claimed is:

1. A device for remotely operating a stationary safety processing system, in particular a safety cutting system or a safety pressing system, comprising:
   a radio remote control that has a first radio transceiver;
   a controller that has a second radio transceiver, wherein the controller is constructed and arranged to be assigned to the stationary safety processing system; and
   a distance monitoring unit that is configured to determine a distance D between the radio remote control and the controller,
   wherein the first radio transceiver and the second radio transceiver are constructed and arranged to connect to one another in terms of communication and are configured to exchange data with one another via radio signals in a connected state,
   wherein the distance monitoring unit and at least the radio remote control or the controller are connected in terms of communication and accordingly configured to transmit a signal corresponding to the distance D from the distance monitoring unit to at least the radio remote control or the controller,
   wherein the controller or the radio remote control is configured to derive an enable signal for a safety processing operation from the distance D correspondingly transmitted from the radio remote control or the distance monitoring unit to the controller or the radio remote control or a signal corresponding to the distance D and a predetermined safety distance $D_{min}$, and accordingly to transmit the enable signal to the controller, and
   wherein the controller is configured to start the safety processing operation based on the presence of a user-induced start signal and the enable signal at the controller.

2. The device as claimed in claim 1, wherein the distance monitoring unit is configured to:
   measure field strengths of the radio signals between the first radio transceiver and the second radio transceiver, and
   derive the distance D from the measured field strengths.

3. The device as claimed in claim 1, wherein the distance monitoring unit is configured to:
   calculate path distances of the radio remote control based on acceleration values of an accelerometer that is arranged on the radio remote control and
   derive the distance D from the calculated path distances or from the measured field strengths and the calculated path distances.

4. The device as claimed in claim 1, wherein the radio remote control has an input apparatus that is connected in terms of communication to the first radio transceiver and is configured to transmit the start signal via the first radio transceiver upon input by way of the input device, and wherein the controller is configured to receive the start signal via the second radio transceiver.

5. The device as claimed in claim 1, wherein the radio remote control and the controller each have a unique address and are constructed and arranged to be coupled uniquely to one another by way of the unique addresses.

6. The device as claimed in claim 1, comprising a fall monitoring unit that is configured to determine the presence of a fall,
   wherein the fall monitoring unit is configured to derive the presence of a fall based on the acceleration values of the accelerometer or based on angular acceleration values of an angular accelerometer that is arranged on the radio remote control, and
   wherein the controller or the radio remote control is configured to derive the enable signal additionally taking into consideration the presence of a fall.

7. The device as claimed in claim 1, wherein the controller is connected to at least one sensor of the stationary safety processing system and is configured to read a progress value of the safety processing operation,
   wherein the controller is configured to transmit a signal corresponding to the progress value from the controller to the radio remote control, and
   wherein the radio remote control is configured to display the progress value by way of the display apparatus.

8. The device as claimed in claim 1, wherein at least one spatial movement unit is provided, by means of which distance monitoring and/or fall monitoring is performed.

9. The device as claimed in claim 8, wherein the spatial movement unit is formed by an inertial measurement unit.

10. The device as claimed in claim 9, wherein the inertial measurement unit has a spatial combination of several inertial sensors, selected from the group of acceleration sensors, rotation meters, rotation sensors, torque transmitters, and gyroscopes.

11. A stationary safety processing system, in particular a safety cutting system or a safety pressing system having a device for remotely operating the safety processing system, comprising:
   a radio remote control that has a first radio transceiver;
   a controller that has a second radio transceiver, wherein the controller is arranged on the stationary safety processing system; and
   a distance monitoring unit that is configured to determine a distance D between the radio remote control and the controller, wherein the first radio transceiver and the second radio transceiver are constructed and arranged to connect to one another in terms of communication and are configured to exchange data with one another via radio signals in a connected state, wherein the distance monitoring unit and at least the radio remote control or the controller are connected in terms of communication and accordingly configured to a signal corresponding to the distance D from the distance monitoring unit to at least the radio remote control or the controller, wherein the controller or the radio remote control is configured to derive an enable signal for a safety processing operation from the distance D correspondingly transmitted from the radio remote control or the distance monitoring unit to the controller or the radio remote control or a signal corresponding to the distance D and a predetermined safety distance $D_{min}$, and accordingly to transmit the enable signal to the controller, and wherein the controller is configured to start the safety processing operation based on the presence of a user-induced start signal and the enable signal at the controller.

12. The safety processing system as claimed in claim 11, wherein the distance monitoring unit is configured to:
measure field strengths of the radio signals between the first radio transceiver and the second radio transceiver, and
derive the distance D from the measured field strengths.

13. A method for remotely operating a safety processing system, in particular a safety cutting system or a safety pressing system, comprising the following steps:
a) Positioning the safety pressing system;
b) Determining a distance D between a first radio transceiver of a radio remote control and a second radio transceiver that is assigned to a safety-relevant area of the safety processing system;
c) Deriving an enable signal for a safety processing operation from the determined distance D and a predetermined safety distance $D_{min}$; and
d) Starting the safety processing operation based on the presence of a user-induced start signal and the enable signal at the controller.

14. The method as claimed in claim 13, wherein determining the distance D in step b) comprises the following steps:
b1.1) Measuring field strengths of radio signals between the first radio transceiver of the radio remote control and the second radio transceiver and
b1.2) Deriving the distance D from the measured field strengths.

15. The method as claimed in claim 13, wherein determining the distance D in step b) comprises the following steps:
b2.1) Calculating path distances of the radio remote control based on acceleration values from an accelerometer and/or an inertial measurement unit that is arranged on the radio remote control, and
b2.2) Deriving the distance D from the calculated path distances or from the measured field strengths and the calculated path distances.

16. The method as claimed in claim 13, wherein, in step d) the start signal is transmitted from the radio remote control to the controller of the safety processing system upon input by way of an input device of the radio remote control.

17. The method as claimed in claim 13, furthermore comprising at least one of the following initialization steps:
i1) Establishing a radio connection between the first radio transceiver of the radio remote control and the second radio transceiver and
i2) Uniquely coupling the first radio transceiver and the second radio transceiver via unique addresses that are in each case assigned to the first radio transceiver and the second radio transceiver; and
wherein at least one of the initialization steps i1) and 12) is executed prior to step b).

18. The method as claimed in claim 17, wherein the unique addresses that are in each case assigned to the first radio transceiver and the second radio transceiver are correspondingly disclosed to one another in a learning operation.

19. The method as claimed in claim 18, furthermore comprising at least one of the following steps:
e) deriving the presence of a fall based on the acceleration values of the accelerometer or based on angular acceleration values of an angular accelerometer that is arranged on the radio remote control, wherein, in step c), the derivation of the enable signal is additionally based on the presence of a fall;
f) transmitting the distance D to the radio remote control and displaying the distance D on a graphic display of the radio remote control;
g) transmitting a progress value of the safety processing operation to the radio remote control and displaying the progress value on the graphic display of the radio remote control; and
h) continuously recording and checking a movement sequence of the radio remote control.

20. The method as claimed in claim 19, furthermore comprising at least one of the following checking steps:
p1) continuously checking a volatile memory of a controller;
p2) continuously checking a non-volatile memory of a controller;
p3) continuously checking an operating voltage and a processor of a controller; and
p4) continuously checking an integrated circuit of a controller.

21. The method as claimed in claim 20, wherein at least one of:
continuously checking the volatile memory of the controller is performed by way of checksum methods;
continuously checking the non-volatile memory of the controller is performed by way of checksum methods;
continuously checking the operating voltage and the processor of the controller is performed by way of a watchdog; and
continuously checking the integrated circuit of the controller is performed by way of plausibility checking methods.

* * * * *